United States Patent Office 2,981,731
Patented Apr. 25, 1961

2,981,731
BENZ[C]ACRIDINE DERIVATIVES

Alexander M. Moore, Pittsburgh, Pa., and Edward F. Elslager and Franklin W. Short, St. Clair Shores, Mich., assignors to Parke, Davis & Company, Detroit, Mich., a corporation of Michigan No Drawing. Filed Sept. 21, 1955, Ser. No. 535,738

6 Claims. (Cl. 260—239.1)

This invention relates to new chemical compounds and to methods for producing the same. More particularly, the invention relates to novel benz[c]acridine compounds and acid addition salts thereof which in the free base form have the formula

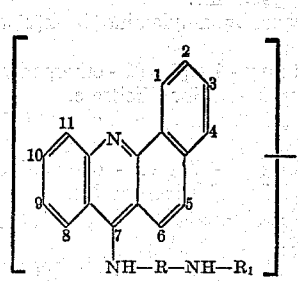

where R is a divalent alkyl group containing from 2 to 6 carbon atoms inclusive, $R_1$ represents an alkyl or hydroxyalkyl radical containing from 2 to 12 carbon atoms inclusive, an alicycloalkyl or aralkyl radical containing from 7 to 12 carbon atoms inclusive or a cycloalkyl radical containing from 5 to 7 carbon atoms inclusive, and Z represents a hydrogen, lower alkyl, lower alkoxy or halogen radical.

The compounds of the invention possess useful chemotherapeutic properties, especially as amebicidal agents, being particularly effective in combatting *E. histolytica*.

The new compounds may be employed in the form of the free base having the above formula or in the form of the addition salt with an organic or inorganic acid. One of the preferred compounds of the invention is 7-(3-octylaminopropylamino)benz[c]acridine or the acid addition salt thereof. In general, addition salts with any relatively non-toxic organic or inorganic acid are suitable. Some typical examples of these salts are the hydrochloride, hydrobromide, sulfate, phosphate, oxalate, sulfamate, sulfonate, acetate, lactate, tartrate, gluconate, citrate, salicylate (particularly 5,5'-methylene disalicylate), benzoate, pamoate (4,4'-methylene bis-(3-hydroxy-2-naphthoate), cresotinate (particularly methylene-di-o-cresotinate), naphthoate, and the like. One of the preferred sulfonic acid salts is the salt of the free base and 8-hydroxy-7-iodo-5-quinoline sulfonic acid. This salt has an advantage in that the acid moiety itself possesses amebicidal properties.

Other preferred salts of the benz[c]acridine compounds are the penicillinates (particularly the benzyl penicillinates); these penicillinate salts are advantageous in that they possess both amebicidal and antibacterial properties.

The benz[c]acridine compounds of the invention are produced by condensing a monoalkylaminoalkylamine having the formula $NH_2$—R—NH—$R_1$ with a 7-substituted benz[c]acridine compound having the formula

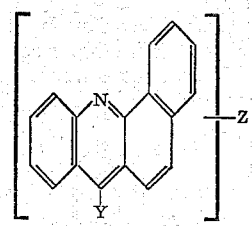

or a naphthylaminobenzoyl halide having the formula

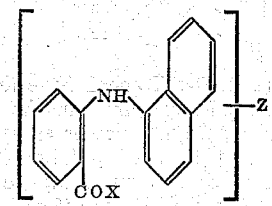

and in the latter case where an amide intermediate is produced having the formula

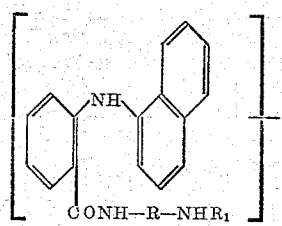

reacting the amide with a cyclizing agent such as phosphorus oxychloride, phosphorus pentachloride, sulfuric acid, polyphosphoric acid and the like; where X is a halogen radical and Y is a halogen, lower alkoxy, phenoxy, lower alkyl mercapto, or phenyl mercapto radical and R, $R_1$ and Z have the above-mentioned significance. In carrying out the condensation it will usually be satisfactory to employ substantially equivalent quantities of the reactants. If desired an excess of either of the reactants may be employed. The use of the monoalkylaminoalkylamine in excess is preferred, inasmuch as it serves in most cases as a particularly useful solvent. Although it is ordinarily unnecessary, an anhydrous inert organic solvent such as benzene, toluene, xylene, dioxane, petroleum ether and the like, may be employed. The temperature of the reaction can be varied considerably and is not particularly critical. In general, the reaction is favored by temperatures in excess of 75° C. Preferably, the reaction is carried out in the range from about 75 to 150° C. If desired the reaction can be carried out under elevated pressure as, for example, in a sealed tube. Condensation catalysts may also be employed. For example, copper salts, copper dust and in particular cuprous chloride can be advantageously employed. In accordance with preferred practice, the reaction is carried out employing a 7-halobenz[c]acridine as a starting material, in the presence of an excess of phenol. In this case, the corresponding phenoxy benz[c]acridine hydrohalide is first formed and the reaction is continued, preferably without isolating the phenoxy benz[c]acridine compound. Further reaction of the phenoxy benz[c]acridine with the monoalkylaminoalkylamine gives the desired 7-monoalkylaminoalkylaminobenz[c]acridine compound. In carrying out the cyclization of the amide intermediate referred to above, the cyclizing agent is conveniently added to the reaction mixture resulting from the condensation of the monoalkylaminoalkylamine and the naphthylaminobenzoyl halide, and the resulting mixture is heated at elevated temperature, i.e. above 75° C. and preferably at reflux temperature. At least one equivalent, or preferably an excess, of the cyclizing agent is employed.

Another method for the production of the benz[c]acridine compounds of the invention comprises condensing an alkylamine having the formula $NH_2-R_1$ with a 7-haloalkylaminobenz[c]acridine having the formula

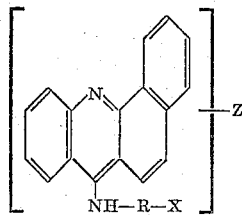

or its salts, where R, $R_1$, X and Z have the above-mentioned significance. In carrying out the condensation, substantially equivalent quantities or an excess of either of the reactants may be employed but for reasons of economy as well as ease of purification of the reaction product an excess of the alkylamine is preferred. An anhydrous organic solvent such as a hydrocarbon, lower aliphatic alcohol, lower aliphatic ketone, cyclic ketone, tertiary amine or the like, may be employed. As specific examples of such solvents may be mentioned benzene, toluene, xylene, petroleum ether, ethanol, n-propanol, n-butanol, isobutanol, n-pentanol, acetone, diethyl ketone, dioxane, pyridine, etc. An excess of the alkylamine may also be employed as the solvent. In general, the reaction is carried out at temperatures between 50 to 100° C.

As indicated above, the benz[c]acridine compounds of the invention can be obtained in either the free base or acid addition salt form. Starting with the acid addition salt, the corresponding free base is obtained by dissolving the acid addition salt in a suitable solvent such as water, ethanol, etc., and neutralizing the solution with an inorganic or organic base such as sodium hydroxide, ammonium hydroxide, sodium carbonate, potassium carbonate, tertiary organic amines and the like. In some instances it will be desirable to obtain the acid addition salt from the free base. The salt can be prepared by reaction of the free base with the corresponding organic or inorganic acid in a suitable solvent. The following specific example serves as an illustration of the method of converting the addition salt of hydrochloric acid to the free base and then converting the free base to the addition salt of a different acid.

0.5 g. of 7-[2-(2-hydroxyethylamino)ethylamino]-benz[c]acridine, dihydrochloride, is shaken with 1 ml. of concentrated ammonium hydroxide in 9 ml. of water. The free base, 7-[2-(2-hydroxyethylamino)ethylamino]-benz[c]acridine, separates out and is isolated by extraction with ether. The ether extract is washed with water and dried over anhydrous potassium carbonate. If desired the free base can be isolated in pure form by filtering off the potassium carbonate and removing the ether in vacuo. Upon addition of an alcoholic solution of citric acid to the ether solution of the free base, the yellow citric acid salt of 7-[2-(2-hydroxyethylamino)-ethylamino]benz[c]acridine precipitates out. This compound is recovered in pure form by filtration and washing the precipitate with alcohol.

A particularly useful salt is derived from the free base and 8-hydroxy-7-iodo-5-quinolinesulfonic acid by reacting in aqueous solution the dihydrochloride salt of the former with a sodium or potassium salt of the latter. Upon completion of the reaction the desired sulfonic acid salt separates out and is isolated from the reaction mixture.

The following compounds are representative of the various benz[c]acridine compounds which are contemplated by the present invention:

(1) 7 - (5 - ethylaminoamylamino) - 10 - methoxybenz-[c]acridine, diacetate.
(2) 7 - (2 - ethylaminoethylamino) - 10 - methylbenz-[c]acridine, dihydrobromide.
(3) 4,4'-methylene-bis(3-hydroxy-2-naphthoic acid) salt of 7-(5-ethylaminoamylamino)benz[c]acridine.
(4) 7 - [3 - (3 - hydroxypropylamino)propylamino]benz-[c]acridine, dihydrochloride.
(5) 7 - (3 - undecylaminopropylamino)benz[c]acridine, lactate.
(6) 2 - methoxy - 7 - (3 - octylaminopropylamino)benz-[c]acridine, dihydrobromide.
(7) 2 - ethoxy - 7 - (3 - decylaminopropylamino)benz-[c]acridine.
(8) 7 - [3 - (1 - ethylpentylamino)propylamino] - 10-ethylbenz[c]acridine.
(9) 7-(5-hexylaminoamylamino)benz[c]acridine, dihydrochloride.
(10) 4 - methoxy - 7 - [3 - (1 - ethylpentylamino)propylamino]benz[c]acridine, dicitrate.
(11) 7-(6-amylaminohexylamino)benz[c]acridine, dihydrochloride.
(12) 1 - methoxy - 7 - (3 - octylaminopropylamino)-benz[c]acridine, dihydrobromide.
(13) 7 - [3 - (1 - ethylhexylamino)propylamino]benz-[c]acridine.
(14) 10 - ethyl - 7 - (3 - hexylaminopropylamino)benz-[c]acridine, dihydrochloride.
(15) 10 - bromo - 7 - (3 - octylaminopropylamino)benz-[c]acridine.
(16) 7 - [3-(4-hydroxycyclohexylamino)propyl-amino]-benz[c]acridine, dihydrobromide.
(17) 7 - [3-(2-hydroxycyclopentylamino)propylamino]-benz[c]acridine, sulfate.
(18) 7 - (3 - cyclohexylaminopropylamino)benz[c]acridine, dihydrochloride.
(19) 10 - chloro - 7 - [3 - (6 - hydroxyhexylamino)propylamino]benz[c]acridine, diphosphate.
(20) 7 - [3 - (10 - hydroxydecylamino)propylamino]-benz[c]acridine, dihydrochloride.
(21) 7 - [3 - (4 - hydroxy - 1 - methylbutylamino)amylamino]benz[c]acridine, dihydrochloride.

EXAMPLE 1

*7-(3-octylaminopropylamino)benz[c]acridine, dihydrochloride*

(a) A mixture of 7.9 g. of 7-chlorobenz[c]acridine and 26 g. of phenol is heated to 80° C. with stirring. At this point, 6 g. of 3-octylaminopropylamine is added and stirring and heating at 110° C. is continued for three hours. After cooling, the mixture is poured into a solution of 90 g. of potassium hydroxide in 300 ml. of water. This alkaline mixture is extracted with ether, the ether extract is washed with water and dried over anhydrous potassium carbonate. After twenty-four hours, the drying agent is collected by filtration and dry hydrogen chloride is passed into the dry ether filtrate. The precipitate thus obtained is collected by filtration, dried in a vacuum desiccator, and recrystallized from ethanol, M.P. 256–257° C. This product, 7-(3-octylaminopropylamino)-benz[c]acridine, dihydrochloride, has the formula

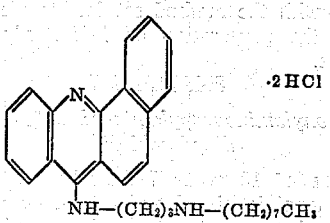

(b) A solution of 14.9 g. of 2-(α-naphthylamino)-benzoyl chloride in 300 ml. of benzene is heated with 9.3 g. of 3-octylaminopropylamine. The product, 2-(α-naphthylamino)benzamidopropylaminooctane having the formula

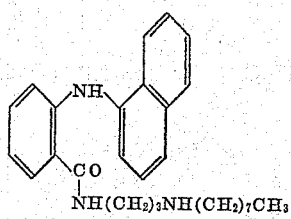

is treated slowly in situ with 18 ml. of phosphorus oxychloride and heated under reflux for six hours. The oil which is deposited is dissolved in ethanol, the solution is diluted with five volumes of ether and treated with gaseous hydrogen chloride. The mixture is held overnight and the yellow precipitate collected by filtration and dried. The product is the desired 7-(3-octylaminopropylamino)benz[c]acridine, dihydrochloride, monohydrate.

The starting material, 2-(α-naphthylamino)benzoyl chloride, is prepared in the following manner: A suspension of 26.3 g. of 2-(α-naphthylamino)benzoic acid in 250 ml. of ligroin is treated with 22.9 g. of phosphorus pentachloride. When the initial vigorous reaction subsides, the mixture is heated for thirty minutes under reflux, and cooled. The precipitate which forms consisting of 2-(α-naphthylamino)benzoyl chloride is collected and recrystallized from ligroin; M. P. 112–114° C.

(c) A mixture of 1.8 g. of 7-(3-bromopropylamino)-benz[c]acridine, 1.3 g. of n-octylamine, and 5 ml. of n-pentanol is heated with mechanical stirring on a steam bath for sixteen hours. The solvent and excess n-octyl amine are removed in vacuo; a small amount of water is added and the mixture is concentrated in vacuo. The residue is made alkaline by the addition of dilute aqueous sodium hydroxide solution and the alkaline mixture extracted with ether. The ether extracts are washed thoroughly with water, dried for twenty-four hours over anhydrous potassium carbonate and filtered. An excess of dry hydrogen chloride is passed into the filtrate and the resulting precipitate is collected and dried under vacuum. The product, 7-(3-octylaminopropylamino)-benz[c]acridine, dihydrochloride, separates and is purified by recrystallization from hot water; M.P. 255–257° C.

The starting material, 7-(3-bromopropylamino)benz[c]-acridine, is prepared in the following manner: A mixture of 105.6 g. of 7-chlorobenz[c]acridine and 500 g. of phenol is stirred and heated for fifteen minutes, 32 g. of 3-aminopropanol is added and stirring and heating continued for three hours. Upon cooling the reaction mixture is made alkaline with aqueous alkali, extracted with chloroform, washed with water and dried. The reaction product, 7-(3-hydroxypropylamino)benz[c]acridine, is isolated by removing the drying agent and chloroform and recrystallizing from ethanol; M.P. 111–113° C. 82 g. of the product is mixed with 180 ml. of redistilled constant-boiling hydrobromic acid and 60 ml. of sulfuric acid and heated under gentle reflux for one-half hour. The reaction mixture is quenched in ice-water and made basic with aqueous ammonia. The resulting insoluble mass is induced to crystallize by scratching and the crystalline product, 7-(3-bromopropylamino)benz[c]acridine, is isolated by filtration, dried, decolorized, and recrystallized from methanol; M.P. 200–202° C.

EXAMPLE 2

*7-(3-octylaminopropylamino)benz[c]acridine, bispenicillin G salt*

A solution of 2.0 g. of 7-(3-octylaminopropylamino)-benz[c]acridine, dihydrochloride, hydrate in 30 ml. of methanol is added dropwise with stirring to a cold solution of 3.1 g. of potassium penicillin G in 60 ml. of water. The gummy product obtained is washed with water, then with ether, triturated with dry ether, and finally obtained solid by grinding under petroleum ether. The yellow solid is collected by filtration and dried at room temperature in vacuo. The desired bispenicillin G salt thus obtained (having a penicillin assay of 1102 units per mg.) has the formula

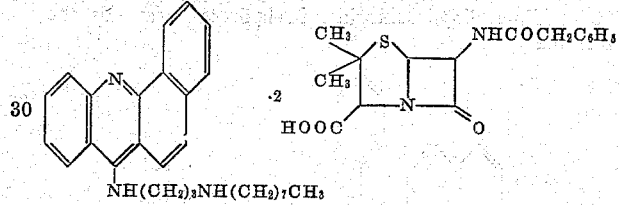

EXAMPLE 3

*7-(3-octylaminopropylamino)benz[c]acridine, bis(8-hydroxy-7-iodo-5-quinolinesulfonic acid) salt*

A hot, filtered solution of 15.1 g. of 7-(3-octylaminopropylamino)benz[c]acridine, dihydrochloride, monohydrate in 1000 ml. of water is added slowly with stirring to a hot, filtered solution of 22.1 g. of 8-hydroxy-7-iodo-5-quinolinesulfonic acid in 1000 ml. of water, containing 2.40 g. of sodium hydroxide. The orange-yellow solid obtained on cooling the mixture is collected, washed with water, powdered in a mortar under water, collected again on a Buchner funnel, washed again with water, and dried. The product obtained, bis(8-hydroxy-7-iodo-5-quinolinesulfonic acid) salt of 7-(3-octylaminopropyl-amino)benz[c]acridine, has the formula

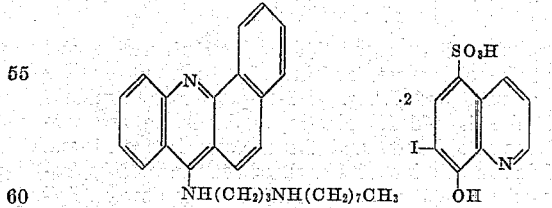

EXAMPLE 4

*7-(3-octylaminopropylamino)benz[c]acridine, disalicylic acid salt*

A solution of 40 g. of 7-(3-octylaminopropyl-amino)-benz[c]acridine, dihydrochloride, monohydrate in 2500 ml. of hot water is made alkaline with excess sodium hydroxide, the free base is extracted from the cooled mixture with ether, the ether extract is washed with water, and dried over anhydrous potassium carbonate. A solution of 24 g. of salicylic acid in 100 ml. dry ether is added slowly to the free base solution. The solution is chilled for several hours and the resulting yellow solid product, 7 - (3 - octylaminopropylamino)benz[c]acridine, disalicylic acid salt, is recovered by filtration; M.P. 122–124° C. This product has the formula

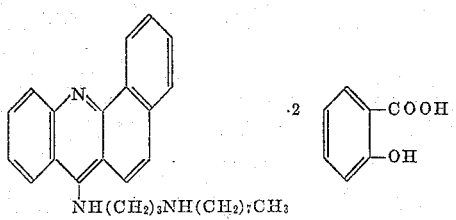

EXAMPLE 5

*7-[3-(1-ethylpentylamino)propylamino]benz[c]acridine, dihydrochloride*

A mixture of 10 g. of 7-chlorobenz[c]acridine and 40 g. of phenol is stirred and heated on a steam bath for fifteen minutes and 7.3 g. of 3-(1-ethylpentylamino)propylamine is added. Heating and stirring on the steam bath are continued for three hours and the reaction mixture is cooled and poured into a solution of 10 ml. of concentrated hydrochloric acid in 400 ml. of acetone. The solid product which separates is collected and recrystallized from water; M.P. 169–171° C. This product, 7 - [3 - (1 - ethylpentylamino) - propylamino]benz-[c]acridine, dihydrochloride, in hydrate form has the formula

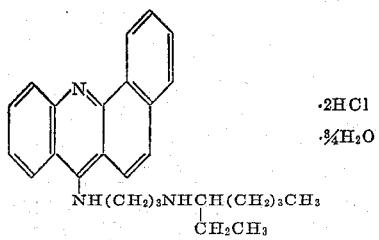

3-(1-ethylpentylamino)propylamine, used in the preparation of the above benz[c]acridine salt, can be obtained in the following manner: 61 g. of 3-bromoheptane is added over a period of forty minutes to 100 g. of 1,3-diaminopropane with stirring at 125° C. The mixture is heated at reflux temperature for four hours, cooled and mixed with a solution of 16 g. of sodium hydroxide in 25 ml. of water. The alkaline mixture is extracted with ether and the extract is dried and the solvent removed in vacuo. The residual product is 3-(2-ethylhexylamino)-propylamine.

EXAMPLE 6

*7-[3(1-propylpentylamino)propylamino]benz[c]acridine, dihydrochloride*

A mixture of 10 g. of 7-chlorobenz[c]acridine and 40 g. of phenol is stirred and heated on a steam bath for fifteen minutes and 7.1 g. of 3-(1-propylpentylamino)-propylamine is added. Heating and stirring are continued for two hours, and the mixture is cooled and poured into a solution of 10 ml. of concentrated hydrochloric acid in 400 ml. of acetone. The yellow precipitate obtained on chilling the mixture is collected by filtration, washed with acetone and recrystallized from water; M.P. 165–171° C. The product, 7-[3-(1-propylpentylamino)propylamino] - benz[c]acridine, dihydrochloride, dihydrate, has the formula

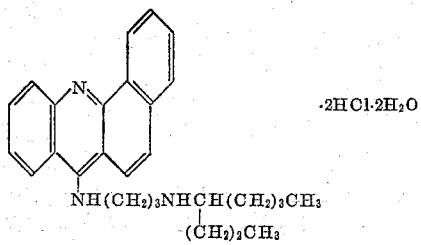

3-(1-propylpentylamino)propylamine, employed as a starting material for the above procedure, can be prepared from 4-chlorooctane and 1,3-diaminopropane in accordance with the method set forth under Example 5 herein for the preparation of 3-(1-ethylpentylamino)-propylamine.

EXAMPLE 7

*7-(3-nonylaminopropylamino)benz[c]acridine, dihydrochloride*

A mixture of 10 g. of 7-chlorobenz[c]acridine and 40 g. of phenol is stirred and heated on a steam bath for fifteen minutes and 8.4 g. of 3-nonylaminopropylamine is added. Heating and stirring are continued for two hours, and the reaction mixture is cooled and poured into a solution of 10 ml. of concentrated hydrochloric acid in 125 ml. of acetone. The product obtained on chilling the mixture is collected, washed with acetone and dried. The product, 7-(3-nonylaminopropylamino)-benz[c]acridine, dihydrochloride, is purified by dissolving in methanol and reprecipitating with ethyl acetate; M.P. 259–261° C. This product in hydrate form has the formula

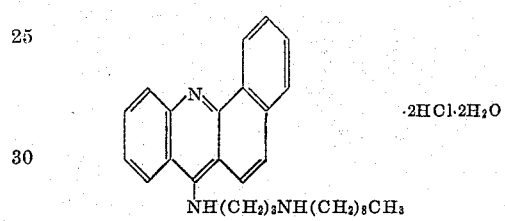

3-nonylaminopropylamine, employed as a starting material for the above procedure, can be prepared from nonyl bromide and 1,3-diaminopropane in accordance with the method set forth under Example 5 herein for the preparation of 3-(1-ethylpentylamino)propylamine.

EXAMPLE 8

*7-(3-isopropylaminopropylamino)benz[c]acridine, dihydrochloride*

(*a*) A mixture of 7.9 g. of 7-chlorobenz[c]acridine and 24 g. of phenol is stirred and heated on a steam bath for fifteen minutes and 4.1 g. of 3-isopropylaminopropylamine is subsequently added. Heating and stirring on the steam bath are continued for three hours, and the mixture is cooled and poured into a solution of 90 g. of potassium hydroxide in 300 cc. of water. This mixture is extracted with ether, the ether extract is washed with water and dried over anhydrous potassium carbonate. After twenty-four hours, the drying agent is collected by filtration and dry hydrogen chloride is passed into the dry ether filtrate. The yellow precipitate which separates is collected by filtration, dried in a vacuum desiccator and recrystallized from ethanol. The recrystallized product is substantially pure 7-(3-isopropylaminopropylamino) benz[c]acridine, dihydrochloride, of formula

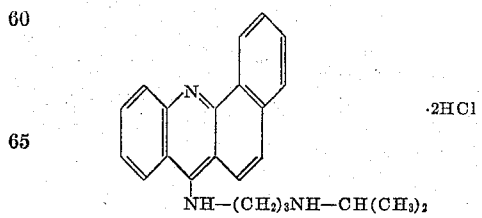

Upon standing, the product takes up one mole of water of hydration in which form the product melts at 267–269° C.

(*b*) A mixture of 16.9 g. of 7-phenylmercaptobenz-[c]acridine and 50 g. of 3-isopropylaminopropylamine is heated under reflux for eight hours. The mixture is cooled and poured into a solution of 270 g. of potassium hydroxide in 1 l. of water. The alkaline mixture is extracted with ether, the ether extract washed with water and dried over anhydrous potassium carbonate. After twenty-four hours, the drying agent is collected by filtration and dry hydrogen chloride is passed into the ether filtrate. The yellow product which precipitates is collected and recrystallized from ethanol; M.P. 267–269° C. The product is 7-(3-isopropylaminopropylamino)-benz[c]acridine, dihydrochloride.

The starting material, 7-phenylmercaptobenz[c]acridine, can be prepared in the following manner: A solution of 11 g. of thiophenol in 50 ml. of absolute ethanol is added slowly to a solution of 2.3 g. of sodium in 100 ml. of absolute ethanol. The resulting mixture is stirred for two hours at room temperature. 26.4 g. of 7-chlorobenz[c]acridine is added and the mixture is heated at reflux temperature for eighteen hours. While hot, the reaction mixture is filtered and the filtrate is treated with decolorizing charcoal. The filtrate is heated to boiling, hot water is added until the solution becomes cloudy and the solution is allowed to cool. The product separates and is collected and purified from acetone-water mixture.

EXAMPLE 9

7-[3-(1-methylheptylamino)propylamino]benz[c]-acridine, dihydrochloride

A mixture of 10 g. of 7-chlorobenz[c]acridine and 40 g. of phenol is stirred and heated on the steam bath for fifteen minutes and there is added 7.8 g. of 3-(1-methylheptylamino)propylamine prepared by the method set forth in Example 5 employing 38.6 g. of 2-bromooctane and 59.2 g. of trimethylene diamine. After heating for two hours on the steam bath, the mixture is cooled to ca. 50° C. and poured into a solution of 10 ml. of conc. hydrochloric acid in 125 ml. of acetone. After chilling, the precipitated solid is collected by filtration, washed thoroughly with acetone and dried; M.P. 188–190° C. The product, the dihydrochloride of 7-[3-(1-methylheptylamino)propylamino]benz[c]acridine has the formula

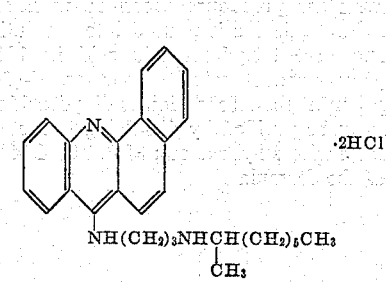

NH(CH₂)₃NHCH(CH₂)₅CH₃
|
CH₃

EXAMPLE 10

7-(5-ictylaminoamylamino)benz[c]acridine, dihydrochloride

A mixture of 10 g. of 7-chlorobenz[c]acridine and 40 g. of phenol is stirred and heated on a steam bath for fifteen minutes and 9 g. of 5-octylaminoamylamine is added. Heating and stirring are continued for two hours, and the reaction mixture is cooled and poured into a solution of 10 ml. of concentrated hydrochloric acid in 125 ml. of acetone. The yellow solid which precipitates is collected, washed with acetone, dissolved in methanol and reprecipitated with ethyl acetate; M.P. 225° C. The product, 7-(5-octylaminoamylamino)benz[c]acridine, dihydrochloride, monohydrate, has the formula The starting material, 5-octylaminoamylamine, can be prepared from octyl chloride, and 1,5-diaminopropane in accordance with the method set forth under Example 5 herein for the preparation of 3-(1-ethylpentylamino)-propylamine.

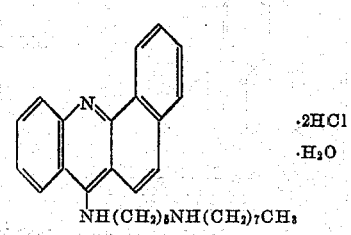

NH(CH₂)₅NH(CH₂)₇CH₃

EXAMPLE 11

7-(3-heptylaminopropylamino)benz[c]acridine, dihydrochloride

A mixture of 10 g. of 7-chlorobenz[c]acridine and 40 g. of phenol is stirred and heated on a steam bath for fifteen minutes, and 7.3 g. of 3-heptylaminopropylamine is subsequently added. After heating and stirring on the steam bath for about two hours, the mixture is cooled and poured into a stirred solution of 10 cc. of concentrated hydrochloric acid in 125 cc. of acetone. A viscous oil separates out and is made to crystallize by chilling and scratching. The product, in crude form, is collected by filtration, washed with acetone, air-dried, and recrystallized from water; M.P. 281–282° C. The product, 7-(3-heptylaminopropylamino)benz[c]acridine, dihydrochloride, has the formula

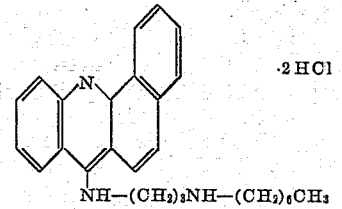

NH—(CH₂)₃NH—(CH₂)₆CH₃

3-heptylaminopropylamine, used in the preparation of the above benz[c]acridine salt, can be obtained in the following manner: 26.5 g. of acrylonitrile is added dropwise over a period of eighty minutes to 86.5 g. of n-heptylamine, with stirring and cooling below 30° C. The mixture is stirred five hours at room temperature, heated on a steam bath for ninety minutes, and held overnight. Fractional distillation of the reaction mixture in vacuo yields N-(β-cyanoethyl)heptylamine as a colorless liquid, B.P. 95–98° C./1 mm.; $n_D^{26.3}$, 1.4424. 75 g. of N-(β-cyanoethyl)heptylamine is hydrogenated in ethanol saturated with ammonia at 130° C. and 1500 p.s.i.g. over Raney nickel catalyst. Fractional distillation of the mixture yields 3-heptylaminopropylamine as a colorless liquid. B.P. 110–120° C./8 min.; $n_D^{26}$, 1.4490.

EXAMPLE 12

7-[3-(2-hydroxyethylamino)propylamino]benz[c]-acridine, dihydrochloride

A mixture of 50 g. of 7-chlorobenz[c]acridine and 200 g. of phenol is stirred and heated on a steam bath for fifteen minutes and 23.6 g. of n-(2-hydroxyethyl)-1,3-propanediamine is added. Heating and stirring are continued for two hours and the cooled mixture is poured into a solution of 33 ml. of concentrated hydrochloric acid in 1000 ml. of acetone. The yellow precipitate obtained on chilling the mixture is collected by filtration, washed with acetone and dried. The product, 7 - [3-(2 - hydroxyethylamino)propylamino]benz[c]acridine, dihydrochloride, is purified by dissolving in methanol and reprecipitating with ethyl acetate; M.P. 215–220° C. The product in monohydrate form has the formula

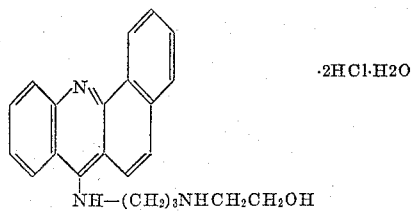

·2HCl·H2O

NH—(CH2)3NHCH2CH2OH

EXAMPLE 13

7-[3-(3-phenylpropylamino)propylamino]benz[c]-acridine, dihydrochloride

A mixture of 10 g. of 7-chlorobenz[c]acridine and 40 g. of phenol is stirred and heated on a steam bath for fifteen minutes and 8.1 g. of 3-(3-phenylpropylamino)propylamine is added. After heating and stirring on the steam bath for about two hours, the mixture is cooled and poured into a solution of 10 ml. of concentrated hydrochloric acid in 125 ml. of acetone. The product which separates, 7-[3-(3-phenylpropylamino)-propylamino]benz[c]acridine, dihydrochloride, dihydrate, can be purified by recrystallization from about 400 ml. of water, using decolorizing carbon; M.P. 260–262° C. The product has the formula

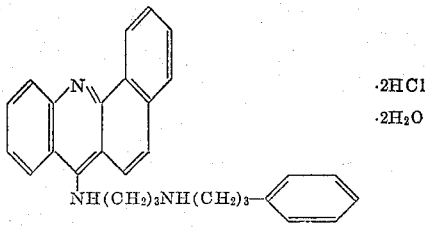

·2HCl
·2H2O

NH(CH2)3NH(CH2)3—

The starting material, 3-(3-phenylpropylamino)propylamine, can be prepared in the following manner: 50 g. of 3-phenylpropylchloride is added over a period of forty minutes to 100 g. of 1,3-diaminopropane with stirring at 125° C. The mixture is heated under reflux for four hours, cooled and held overnight at room temperature, and mixed with a solution of 16 g. of sodium hydroxide in 25 ml. of water. The alkaline mixture is extracted with ether, the extract dried over anhydrous potassium carbonate, and the solvent removed in vacuo to provide 3-(3-phenylpropylamino)propylamine; $n_D^{27}$, 1.5240.

EXAMPLE 14

7-[3-(2-ethylhexylamino)propylamino]benz[c]-acridine, dihydrochloride

A mixture of 10 g. of 7-chlorobenz[c]acridine and 7.8 g. of 3-(2-ethylhexylamino)propylamine is reacted in accordance with the procedure described in Example 12 above. The reaction mixture is poured into a solution of 10 ml. of concentrated hydrochloric acid in 125 ml. of acetone. The product which separates, 7-[3-(2-ethylhexylamino)propylamino]benz[c]acridine, dihydrochloride, can be purified by recrystallization from 300 ml. of water. The product melts at 169–170° C., resolidifies on further heating, and melts finally at 235–240° C. The product in hydrate form has the formula

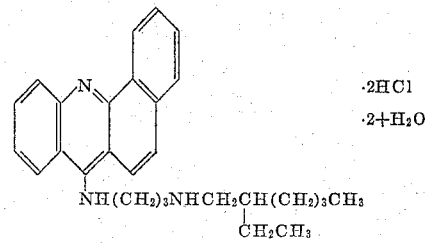

·2HCl
·2+H2O

NH(CH2)3NHCH2CH(CH2)3CH3
         |
         CH2CH3

The starting material, 3-(2-ethylhexylamino)-propylamine, can be prepared from 2-ethylhexylchloride and 1-3-diaminopropane in accordance with the method described in Example 13 for the preparation of 3-(3-phenylpropylamino)propylamine.

EXAMPLE 15

7-(3-hexylaminopropylamino)benz[c]acridine, dihydrochloride

A stirred mixture of 10 g. of 7-chlorobenz[c]acridine and 40 g. of phenol is heated on a steam bath for fifteen minutes. To this mixture is then added 6.7 g. of 3-hexylaminopropylamine and heating is continued for two hours. The cooled reaction mixture is poured into a solution of 10 cc. of concentrated hydrochloric acid in 125 cc. of acetone and the viscous oil which separates is made to crystallize by chilling and scratching. The crude product is collected by filtration, washed with acetone, air-dried, and recrystallized from dilute hydrochloric acid. The product, 7-(3-hexylaminopropylamino)benz[c]acridine, dihydrochloride, has the formula

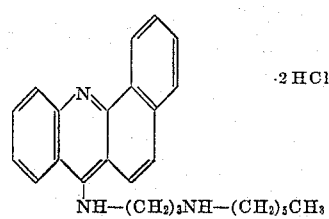

·2HCl

NH—(CH2)3NH—(CH2)5CH3

The monohydrate which forms upon standing has a melting point of 283–284° C.

EXAMPLE 16

7-(3-dodecylaminopropylamino)benz[c]acridine, dihydrochloride (a) From 7-chlorobenz[c]acridine.—A mixture of 10 g. of 7-chlorobenz[c]acridine and 10.2 g. of 3-dodecylaminopropylamine is reacted in 40 g. of phenol in accordance with the procedure described in Example 12, and the reaction mixture is poured into a solution of 10 ml. of concentrated hydrochloric acid in 125 ml. of acetone. The product which separates, 7-(3-dodecylaminopropylamino)benz[c]acridine, dihydrochloride, tetrahydrate, can be purified by dissolving in methanol and reprecipitating with ethyl acetate; M.P. 251–254° C. The product has the formula

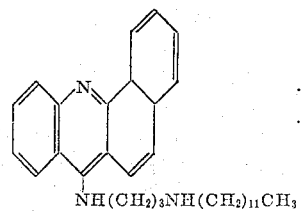

·2HCl
·4H2O

NH(CH2)3NH(CH2)11CH3

(b) From 7-phenoxybenz[c]acridine.—13.6 g. of 7-phenoxybenz[c]acridine is heated with 10.2 g. of 3-dodecylaminopropylamine in 50 ml. of pyridine at 100° for five hours. The solvent is evaporated in vacuo, the residue is dissolved in ether, and the ether solution is washed with water and dried over anhydrous sodium sulfate. Addition of isopropanolic hydrogen chloride to the dried ether extract causes the desired 7-(3-dodecylaminopropylamino)benz[c]acridine, dihydrochloride, tetrahydrate to precipitate as a yellow solid; M.P. 251–254° C. after recrystallization from methanol-ethylacetate.

3-dodecylaminopropylamine, the starting material for the above procedure, can be prepared from dodecylbromide and 1,3-diaminopropane by the method described in Example 13 above for the preparation of 3-(3-phenyl-propylamino)propylamine. 7 - phenoxybenz[c]acridine, the starting material for (b) above, can be prepared as follows: A mixture of 10 g. of 7-chlorobenz[c]acridine and 40 g. of phenol is stirred and heated on a steam bath for about two hours, and the reaction mixture is cooled and dissolved in 500 ml. of acetone. The 7-phenoxybenz-[c]acridine hydrochloride which separates on cooling is collected, washed with acetone, dissolved in methanol and reprecipitated with ether. The hydrochloride is converted to the free base by stirring with concentrated ammonium hydroxide.

EXAMPLE 17

*7-(3-cyclohexylethylaminopropylamino)benz[c]-acridine, dihydrochloride*

(a) *From 7-ethylmercaptobenz[c]acridine.*—A mixture of 2.9 g. of 7-ethylmercaptobenz[c]acridine, 1.84 g. of 3-(2-cyclohexylethyl)aminopropylamine, and 20 g. of phenol is stirred and heated on a steam bath for three hours. The mixture is cooled and slowly poured into a solution of 5 ml. of concentrated hydrochloric acid in 75 ml. of acetone. The product which separates is collected and purified by dissolving in boiling methanol and reprecipitating with ethyl acetate, then by recrystallization from water; M.P. 272–274° C. The product, 7-[3-(2-cyclohexylethylamino)propylamino]benz[c]acridine, dihydrochloride, dihydrate, has the formula

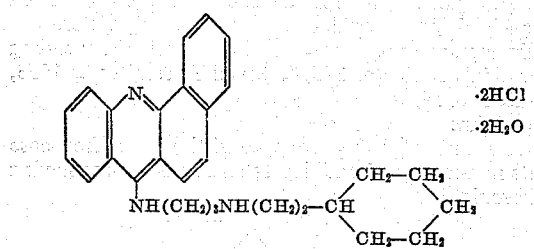

7-ethylmercaptobenz[c]acridine, employed as a starting material for (a) above, can be prepared in the following manner: A solution of 6.2 g. of ethanethiol in 50 ml. of absolute ethanol is slowly added to a solution of 2.3 g. of sodium in 100 ml. of absolute ethanol. The mixture is stirred for two hours at room temperature, 26.4 g. of 7-chlorobenz[c]acridine is added, and the mixture is refluxed for sixteen hours. The mixture is filtered while hot, the filtrate treated with decolorizing charcoal, heated to boiling and hot water is added until the solution becomes cloudy. On cooling, 7-ethylmercaptobenz[c]-acridine separates and is collected and purified from a mixture of acetone and water.

(b) *From 7-chlorobenz[c]acridine.*—10.0 g. of 7-chlorobenz[c]acridine and 7.7 g. of 3-(2-cyclohexylethylamino)propylamine are reacted in 40 g. of phenol in accordance with the procedure described in Example 12, and the reaction mixture is poured into a solution of 10 ml. of concentrated hydrochloric acid in 125 ml. of acetone. The product, 7-[3-(2-cyclohexylethylamino)propylamino]benz[c]acridine, dihydrochloride, dihydrate, is purified by dissolving in hot methanol and reprecipitating with ethyl acetate, followed by recrystallization from water; M.P. 271—274° C.

EXAMPLE 18

*7-(3-cyclohexylaminopropylamino)benz[c]acridine, dihydrochloride*

10.0 g. of 7-chlorobenz[c]acridine and 6.5 g. of 3-(cyclohexylamino)propylamine are reacted in 40 g. of phenol and the reaction mixture further treated with hydrochloric acid, in accordance with the method of Example 17. The product, 7-(3-cyclohexylaminopropylamino)benz[c]acridine, dihydrochloride, has the formula

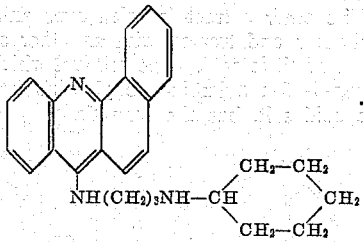

The corresponding 7-(3-cyclopentylaminopropylamino)benz[c]acridine, dihydrochloride, can be prepared in the same manner starting with 10.0 g. of 7-chlorobenz[c]acridine and 5.9 g. of 3-cyclopentylamino)propylamine.

EXAMPLE 19

*10-chloro-7-(3-octylaminopropylamino)benz[c]acridine, sulfate*

A mixture of 8.9 g. of 7,10-dichlorobenz[c]acridine and 26 g. of phenol is heated to 80° C. with stirring. 6 g. of 3-octylaminopropylamine is added and the mixture is stirred and heated at 110° C. for three hours. After cooling, the reaction mixture is poured into a solution of 90 g. of potassium hydroxide in 300 ml. of water. The alkaline mixture is extracted with ether, the ether extract washed with water and dried over anhydrous potassium carbonate. After twenty-four hours, the drying agent is collected by filtration and concentrated sulfuric acid is added to the ether solution. The precipitate which forms is collected by filtration, dried in a vacuum desiccator, and recrystallized from ethanol. The product, 10-chloro-7-(3-octylaminopropylamino)benz[c]acridine sulfate, has the formula

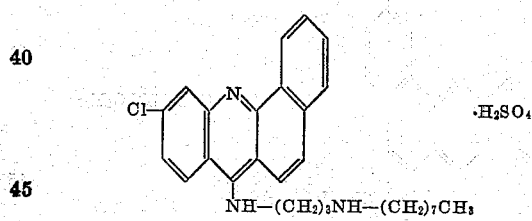

EXAMPLE 20

*2-methoxy-7-(3-nonylaminopropylamino)benz[c]-acridine, citric acid salt*

A solution of 4.8 g. of methanethiol in 50 ml. of absolute ethanol is slowly added to a solution of 2.3 g. of sodium in 100 ml. of absolute ethanol. The resulting mixture is stirred for two hours at room temperature, 29.4 g. of 7-chloro-2-methoxybenz[c]acridine is added, and the mixture refluxed for sixteen hours. The reaction mixture is filtered while hot, the filtrate treated with decolorizing charcoal, heated to boiling, and hot water is added until the solution becomes cloudy. After cooling, the material which separates is purified by reprecipitation from an acetone-water mixture. The product, 2-methoxy-7-methylmercaptobenz[c]acridine, has the formula

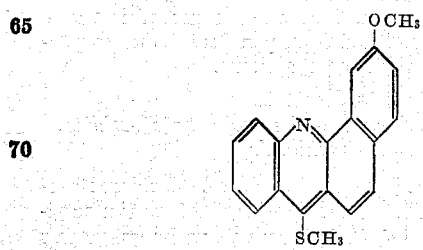

A mixture of 30.5 g. of 2-methoxy-7-methylmercaptobenz[c]acridine, 20 g. of 3-nonylaminopropylamine and 100 ml. of dry pyridine is refluxed for five hours. The pyridine is removed in vacuo and the residue is extracted with ether. The ether extract is dried over anhydrous potassium carbonate and treated with an ether solution containing 19 g. of citric acid. The product which separates, 2-methoxy-7-(3-nonylaminopropylamino)benz-[c]-acridine citric acid salt, has the formula

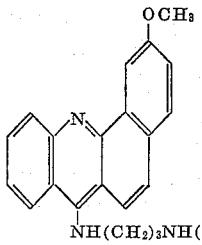
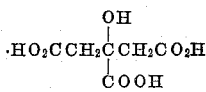

EXAMPLE 21

*10-methyl-7[3-(1-ethylpentylamino)propylamino]-benz[c]-acridine, tartaric acid salt*

A mixture of 2.78 g. of 7-chloro-10 methylbenz[c]acridine and 5 g. of phenol is stirred and heated on a steam bath for ten minutes, and 1.9 g. of 3-(1-ethylpentylamino)propylamine is added. The mixture is stirred and heated on the steam bath for three hours and is then cooled and poured into a solution of 50 g. of sodium hydroxide in 200 ml. of water. The alkaline mixture is extracted with ether, the ether extract is washed with water and dried over anhydrous potassium carbonate. After twenty-four hours, the drying agent is collected by filtration and the filtrate treated and an ether solution of 0.011 mole of tartaric acid. The product which precipitates, 10-methyl - 7-[3 - (1 - ethylpentylamino)propylamino]-benz[c]acridine tartaric acid salt, has the formula

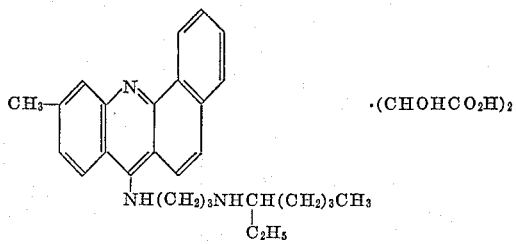

The starting material, 7-chloro-10-methylbenz[c]acridine, can be prepared in the following manner: A mixture of 3.82 g. of 2-chloro-4-methylbenzoic acid, 18.0 g. of 1-naphthylamine, 4.0 g. of anhydrous potassium carbonate, 0.1 g. of potassium iodide and 0.5 g. of precipitated copper is stirred and heated at 180° C. for three and one-half hours. The reaction mixture while warm is extracted with benzene and water, the combined aqueous extracts are filtered and the filtrate is acidified with 2 N hydrochloric acid. 4-methyl-2-(α-naphthylamino)benzoic acid separates from the filtrate and is collected and crystallized from a water-ethanol mixture. A mixture of 2.1 g. of the crystalline acid and 30 ml. of redistilled phosphorous oxychloride is refluxed for two hours. Excess phosphorus oxychloride is removed in vacuo and the residue is slowly poured into concentrated ammonium hydroxide-excess ice solution. The mixture is extracted with benzene, the benzene removed in vacuo and the residue crystallized from petroleum ether to provide 7-chloro-10-methylbenz[c]acridine.

EXAMPLE 22

*10-chloro-7-(2-octylaminoethylamino)benz[c]acridine, dihydrochloride*

A mixture of 3.6 g. of 10-chloro-7-(2-chloroethyl-amino-benz[c]acridine, hydrochloride and 3 g. of n-octylamine is stirred at 60° C. for seventy-two hours. After cooling, the reaction mixture is poured into an excess of cold dilute hydrochloric acid solution. The octylamine hydrochloride present is allowed to dissolve and the desired 10-chloro-7-(2-octylaminoethylamino)benz-[c]acridine, dihydrochloride, is collected by filtration and recrystallized from hot water. This product has the formula

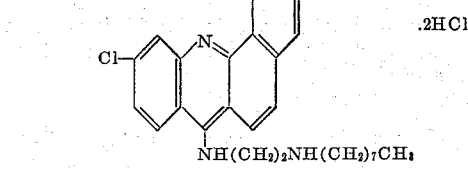

The starting material, 10-chloro-7-(2-chloroethylamino)benz[c]acridine, hydrochloride, can be prepared in the following manner: A mixture of 40 g. of 7,10-dichlorobenz[c]acridine and 150 ml. of ethanolamine is heated with stirring to 170° C. to accomplish complete solution and heating is continued for four hours at 140° C. On cooling, the product which separates is collected, triturated in acetone, slurried with hot isopropanol and the slurry cooled to 0° C. 10-chloro-7-(2-hydroxyethylamino)benz[c]acridine separates and is collected by filtration and dried. A mixture of 26 g. of the 10-chloro-7-(2-hydroxyethylamino)-benz[c]acridine and 10 ml. of thionyl chloride is heated at reflux temperature for one hour. On cooling, 10-chloro-7-(2-chloroethylamino)-benz[c]acridine, hydrochloride, separates and is collected and purified by recrystallization from boiling water.

This application is a continuation-in-part of copending application Serial No. 395,829, filed December 2, 1953, now abandoned.

We claim:
1. A member of the group consisting of a free base and its non-toxic acid addition salts, said free base having the formula

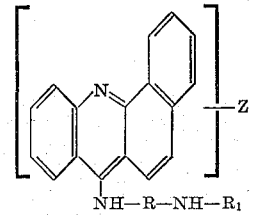

where R is a divalent alkyl group containing from 2 to 6 carbon atoms inclusive, R₁ is a member of the group consisting of alkyl and hydroxyalkyl radicals containing from 2 to 12 carbon atoms inclusive, alicycloalkyl and aralkyl radicals containing from 7 to 12 carbon atoms inclusive and cycloalkyl radicals containing from 5 to 7 carbon atoms inclusive and Z is a member of the group consisting of hydrogen, lower alkyl, lower alkoxy and halogen radicals.

2. 7-(3-octylaminopropylamino)benz[c]acridine.
3. An acid addition salt of 7-(3-octylaminopropylamino)benz[c]acridine.
4. A penicillin salt of 7-(3-octylaminopropylamino)-benz[c]acridine.
5. 7 - [3 - (1-ethylpentylamino)propylamino]benz[c]-acridine.
6. 7 - [3-(1-propylpentylamino)propylamino]benz[c]-acridine.

References Cited in the file of this patent

Bachman et al.: J. Org. Chem. (1946) vol. 11, pp. 454–459.

Picha et al.: Jour. Am. Chem. Soc., vol. 68 (1946), pp. 1599–1602.

Wiselogle: Survey of Antimalarial Drugs, vol. II, part 2, (1946), pp. 1380–1381; 1339 and 1344.